(12) United States Patent
Kohn et al.

(10) Patent No.: US 6,602,497 B1
(45) Date of Patent: Aug. 5, 2003

(54) STRICTLY ALTERNATING POLY (ALKYLENE OXIDE ETHER) COPOLYMERS

(75) Inventors: Joachim B. Kohn, Highland Park, NJ (US); Durgadas Bolikal, Edison, NJ (US); Francesca D'Acunzo, Piscataway, NJ (US)

(73) Assignee: Rutgers, The State University, New Brunswick, NJ (US)

( * ) Notice: Subject to any disclaimer, the term of this patent is extended or adjusted under 35 U.S.C. 154(b) by 0 days.

(21) Appl. No.: 09/554,021

(22) PCT Filed: Nov. 6, 1998

(86) PCT No.: PCT/US98/23737

§ 371 (c)(1), (2), (4) Date: Jun. 26, 2000

(87) PCT Pub. No.: WO99/24490

PCT Pub. Date: May 20, 1999

Related U.S. Application Data

(60) Provisional application No. 60/064,905, filed on Nov. 7, 1997.

(51) Int. Cl.[7] .................. A61K 31/74; A61K 47/48; C08F 5/20
(52) U.S. Cl. ................ 424/78.08; 424/78.17; 521/30
(58) Field of Search ............... 424/408, 78.08, 424/78.17; 521/30

(56) References Cited

U.S. PATENT DOCUMENTS

| | | | |
|---|---|---|---|
| 4,436,933 A | 3/1984 | Diery | 562/470 |
| 5,216,115 A | 6/1993 | Kohn et al. | 528/176 |
| 5,219,564 A | 6/1993 | Zalipsky et al. | 424/78.17 |
| 5,372,807 A | 12/1994 | Poiani et al. | 424/78.36 |
| 5,455,027 A | 10/1995 | Zalipsky et al. | 424/78.17 |
| 5,587,507 A | 12/1996 | Kohn et al. | 560/40 |
| 5,658,995 A | 8/1997 | Kohn et al. | 525/432 |
| 5,660,822 A | 8/1997 | Poiani et al. | 424/78.17 |
| 5,670,602 A | 9/1997 | Kohn et al. | 528/176 |
| 5,720,950 A | 2/1998 | Poiani et al. | 424/78.29 |
| 6,284,862 B1 | 9/2001 | Kohn et al. | 528/176 |

FOREIGN PATENT DOCUMENTS

| | | | |
|---|---|---|---|
| EP | 0075166 | * | 3/1983 |
| WO | WO97/04744 | | 2/1997 |

OTHER PUBLICATIONS

Li et al., "Synthesis of Poly(iminocarbonates): Degradable Polymers with Potential Applications as Disposable Plastics and as Biomaterials," *Macromol.*, 22(5), 2029–2036 (1989).

Pulapura et al., "Tyrosine–Derived Polycarbonates: Backbone–Modified 'Pseudo'—Poly(Amino Acids) Designed for Biomedical Applications," *Biopolymers*, 32, 411–417 (1992).

Mao et al. "Synthesis and Biological Properties of Polymer Immunadjuvants," *Polym. J.*, 25(5), 449–505 (1993).

Annaka et al. "Multiple phases of polymer gels," *Nature*, 355, 430–32 (1992).

* cited by examiner

*Primary Examiner*—Alton N. Pryor
(74) *Attorney, Agent, or Firm*—Synnestvedt & Lechner LLP

(57) ABSTRACT

A polyether copolymer characterized by strictly alternating poly(alkyleneoxide) and aromatic diol monomeric repeating units, wherein the combination of repeating units is effective to provide said polyether with a hydrophillic/hydrophobic ratio at which aqueous micelle self-assembly occurs.

55 Claims, No Drawings

US 6,602,497 B1

STRICTLY ALTERNATING POLY(ALKYLENE OXIDE ETHER) COPOLYMERS

CROSS REFERENCE TO RELATED APPLICATION

This application is a 371 of PCT/US98/23737 filed Nov. 6, 1998 which claims priority benefit of U.S. Provisional Patent Application Ser. No. 60/064,905 filed on Nov. 7, 1997, the disclosure of which is incorporated herein by reference.

TECHNICAL FIELD

The present invention relates to strictly alternating poly(alkylene oxide ether) copolymers that self-assemble in aqueous media to form micelles that are useful for the delivery of hydrophobic drugs.

BACKGROUND ART

Many important drugs are hydrophobic, particularly the anti-neoplastic agents, such as daunomycin and adriamycin. To date, the delivery of hydrophobic drugs has been problematic. Hydrophobic drugs are not effectively absorbed into the blood stream by the stomach or small intestine, making oral delivery impractical, if not impossible. Instead, hydrophobic drugs are usually delivered parenterally, intravenously or intramuscularly.

Even when delivered by one of these methods, the hydrophobic drug must be uniformly distributed in a biocompatible, typically aqueous medium. This requires the use of a surfactant. The surfactants are amphiphilic molecules that form micellar structures having hydrophobic interiors into which the hydrophobic drug is incorporated and hydrophilic exterior which maintain a stable dispersion in aqueous media.

Repulsion between similar charges keeps the micelles dispersed. Dispersion stability therefore depends upon micellar concentration. Every surfactant has a minimum micellar concentration (MC), below which the micelles fall apart.

Many surfactants are unsuitable for hydrophobic drug delivery because the dilution that occurs upon injection into the blood stream causes the MC to drop below the minimum concentration. Many other surfactants are unsuitable because they produce side-effects in the patient. Many times interferences and interactions produced by administering surfactant stabilized aqueous dispersions of hydrophobic drugs are caused by the surfactant, rather than by the drug itself.

Biocompatibility is also essential in order to avoid toxicity, as well as to prevent rapid clearance of the micelles from the patient's bloodstream. The reduction of the clearance rate by administering the drug in a more biocompatible form also increases the dose efficiency, so that the amount of the drug that is administered may be reduced. This also reduces the occurrence of toxic side-effects.

The ideal surfactant is therefore biocompatible and has a minimum MC below the concentration produced by dilution upon injection into the patient's bloodstream. A class of surfactants with low minimum MC's are the polymeric surfactants, or polysoaps. Shin et al. *J. Control Rel.*, 51, 1–11 (1998) discloses a polymeric surfactant that is a diblock copolymer of methoxy polyethylene glycol and e caprolactone. This polymer, however, does not self-assemble into micelles in aqueous solution, complicating the preparation of aqueous dispersions for drug delivery.

U.S. Pat. No. 5,219,564 discloses polyamide and polyetherurethane copolymers of polyethylene glycol and lysine having pendent chains to which drugs may be covalently attached for delivery. The disclosed polymers are highly hydrophilic and do not assemble into micellar structures when a hydrophilic drug is attached to them.

There remains a need for biocompatible polymeric surfactants with sufficiently low minimum MC's to withstand dilution upon injection into a patient that also self-assemble into micelles in aqueous solution.

SUMMARY OF THE INVENTION

This need is met by the present invention. Polyethers copolymerized from poly(alkylene oxides) and aromatic diols have now been discovered that self-assemble to form micelles in aqueous solution. The present invention incorporates the discovery that the aqueous micelle self-assembly is determined by the hydrophilic/hydrophobic ratio of the polyether. Both the poly(alkylene oxides) and the aromatic diols may be selected to obtain a polyether capable of aqueous micelle self-assembly occurs.

Therefore, according to one aspect of the present invention, a polyether comprising strictly alternating poly(alkylene oxide) and aromatic diol monomeric repeating units is provided wherein the combination of repeating units is effective to provide the polymer with a hydrophilic/hydrophobic ratio at which micelle self-assembly will occur in aqueous solution. Aromatic diols are defined as including diphenols.

The polyethers of the present invention possess broad utility beyond medical or pharmaceutical uses. Accordingly, it is not essential that the polyether be non-toxic or biocompatible. However, biocompatible polymers are preferred for medical uses.

In preferred polyethers according to the present invention, the poly(alkylene oxide) and aromatic diol form a repeating segment having the structure of Formula I:

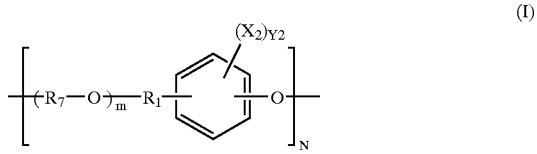

wherein $R_1$ is selected from alkyl, aryl, and alkylaryl groups containing up to 18 carbon atoms; $R_7$ is selected from alkylene groups containing from 1 to 4 carbon atoms; m is between about 5 and about 3,000; $X_2$ is independently an iodine or bromine atom; and Y2 is between 0 and 2, inclusive. Preferably, $R_1$ contains as part of its structure a pendent carboxylic acid group or an ester or amide thereof, wherein the ester or amide is selected from straight and branched alkyl and alkylaryl groups containing up to 18 carbon atoms, in addition to the rest of the $R_1$ structure and derivatives of biologically and pharmaceutically active compounds. The pendent carboxylic acid group permits substitution of monomer repeating units with hydrophilic or hydrophobic moieties to attenuate the hydrophilic/hydrophobic character of the polyether. The side chain also permits the covalent attachment to the polymer of the drug to delivered, if desired. Because of the hydrophobic nature of the aromatic diol, conjugation reactions with hydrophobic drugs are not disfavored. $R_1$ can also contain non-carbon atoms such as iodine, bromine, nitrogen and oxygen.

Formula I preferably is a structure related to derivatives of tyrosine joined by way of an amide linkage to a α, β or γ-hydroxy acid or derivative thereof, having the structure of Formula II:

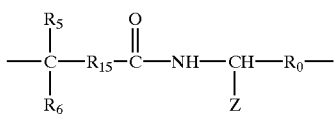

(II)

wherein $R_5$ and $R_6$ are each independently selected from H, Br, I and straight and branched alkyl groups having up to 18 carbon atoms; $R_0$ is $(-CH_2-)_d$, $-CH=CH-$ or $(-CHJ_1-CHJ_2-)$, $R_{15}$ are $(-CH_2-)_c$, $-CH=CH-$ or $(-CHJ_1-CHJ_2-)$, wherein $J_1$ and $J_2$ are independently selected from Br and I; c and d are between 0 and 8, inclusive; and Z is H, a free carboxylic acid group, or an ester or amide thereof. Z preferably is a pendent group having a structure according to Formula III:

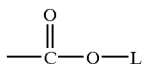

(III)

wherein L is selected from hydrogen and straight and branched alkyl and alkylaryl groups containing up to 18 carbon atoms and derivatives of biologically and pharmaceutically active compounds.

Z can also be a pendent group having a structure according to Formula IIIa:

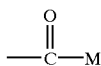

(IIIa)

wherein M is selected from $-OH$, $-NH-NH_2$, $-O-R_8-NH_2$, $-O-R_8-OH$, $-NH-R_8-NH_2$, $-NH-R_8-OH$,

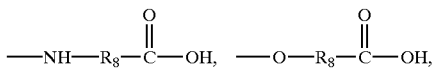

a C-terminus protecting group and a derivative of a biologically or pharmaceutically active compound covalently bonded to the pendent functional group by means of an amide bond in the case when in the underivatized biologically or pharmaceutically active compound a primary or secondary amine is present in the position of the amide bond in the derivatives, or an ester bond in the case when in the underivatized biologically or pharmaceutically active compound a hydroxyl or thiol is present in the position of the ester bond in the derivative. Z can also be a pendent group having a structure represented by Formula IIIb:

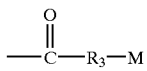

(IIIb)

wherein M is a derivative of a biologically or pharmaceutically active compound covalently bonded to the pendent functional group by means of $R_3$, wherein $R_3$ is a linkage selected from $-NH-NH-$ in the case when in the underivatized biologically or pharmaceutically active compound an aldehyde or ketone is present at the position linked to the pendent functional group by means of $R_3$; and $-NH-NH-$, $-NH-R_8-NH$, $-O-R_8-NH-$, $-O-R_8-O-$ or $-NH-R_8-O-$ in the case when in the underivatized biologically or pharmaceutically active compound a carboxylic acid is present in the position linked to the pendent functional group by means of X; and

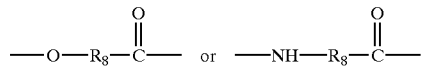

in the case when in the underivatized biologically or pharmaceutically active compound a primary or secondary amine or primary hydroxyl is present in the position linked to the pendent functional group by means of X.

$R_8$ is selected from alkylene groups containing from 2 to 6 carbon atoms, aromatic groups, α-, β-, γ- and ω-amino acids and peptide sequences.

In other preferred embodiments of the present invention, $R_1$ is selected so that the polyether is a copolymer of a poly(alkylene oxide) and a diphenol. For polymers having the structure of Formula I derived from diphenols, $R_1$ has the structure of Formula IV:

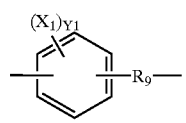

(IV)

wherein $X_1$ is I or Br, Y1 is between 0 and 2, inclusive; and $R_9$ is selected from alkyl, aryl or alkylaryl groups containing up to 18 carbon atoms. Preferably, $R_9$ contains as part of its structure a pendent free carboxylic acid group or an ester or amide thereof, wherein the ester or amide is selected from straight and branched alkyl and alkylaryl groups containing up to 18 carbon atoms in addition to the rest of the $R_9$ structure and derivatives of biologically and pharmaceutically active compounds. $R_9$ can also contain non-carbon atoms such as I, Br, N and O.

In particular, $R_9$ can have a structure related to derivatives of the natural amino acid tyrosine, cinnamic acid or 3-(4-hydroxyphenyl)propionic acid. In these cases, $R_9$ assumes the specific structure shown in Formula V:

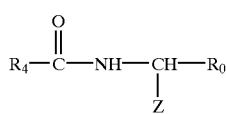

(II)

$R_0$ and Z are the same as described above with respect to Formula II. $R_4$ is selected from $-CH=CH-$, $(-CHJ_1-CHJ_2-)$ and $(-CH_2-)_a$ in which a is between 0 and 8, inclusive, and $J_1$ and $J_2$ are independently selected from Br and I.

The polyethers of the present invention include polymers meeting the need for biocompatible polymeric surfactants for hydrophobic drug delivery that self-assemble to form micelles in aqueous media. The polyethers have advantages over other types of biocompatible polymers for other reasons, as well. The poly(alkylene oxide) segments strictly alternating within the polymer distribute hydrophilic and hydrophobic regions of the polyether uniformly along the polymer chain. Furthermore, the poly(alkylene oxide) activation for this type of polymerization is relatively easy, so that large scale production is simple and low-cost.

The strictly alternating poly(alkylene oxide) segments decrease the surface adhesion of the polyethers of the present invention. Coatings of the polyethers according to the present invention are resistant to cell attachment and are useful as non-thrombogenic coatings on surfaces in contact with blood. The polyether also resists bacterial adhesion in this, and in other medical applications as well. The present invention therefore includes blood contacting devices and medical implants having surfaces coated with the polyethers of the present invention. The surfaces are preferably polymeric surfaces. Methods according to the present invention include implanting in the body of a patient a blood-contacting device or medical implant having a surface coated with a polyether of the present invention.

Blood contacting or implantable medical devices formed from the polyethers of the present invention are also included within the scope of the present invention as well. Polyethers containing iodine or bromine are radio-opaque and useful in medical implant applications in which this property is desirable.

The polyethers of the present invention are also suitable for applications in which localized drug delivery is desired. The present invention therefore also includes biologically or pharmaceutically active compounds physically admixed, embedded in or dispersed in the polymer matrix. Another aspect of this embodiment of the present invention provides a method for site-specific or systemic drug delivery by delivering to the body of a patient in need thereof a therapeutically effective amount of a biologically or pharmaceutically active compound in combination with a polyether of the present invention. In addition to implantable dosage forms of the polyethers in which a biologically or pharmaceutically active compound is physically admixed, embedded in or dispersed, methods and dosage forms according to this aspect of the present invention also include aqueous dispersions of hydrophobic biologically or pharmaceutically active compounds within micelles of the polyethers of the present invention, which are delivered parenterally, intravenously or intramuscularly.

Another important phenomena unrelated to the aqueous micelle self-assembly that was observed for the polyethers of the present invention is the temperature dependent inverse phase transition of the polymer gel or the polymer solution in aqueous solvents. Inverse temperature transitions have been observed for several natural and synthetic polymer systems, such as proteins and protein-based polymers as described by Urry, *Tissue Engineering; Current Perspectives* (Boston Berkhauser, N.Y.), 199–206; Poly(acrylic acid) derived copolymers as described by Annaka et al., *Nature*, 355, 430–32 (1992); Tanaka et al., *Phys. Rev. Lett.*, 45(20), 1636–39, (1980) and Hirokawa et al., *J. Chem. Phys.*, 81(12), 6379–80 (1984), and poly(ethylene glycol)-poly(propylene glycol) copolymers as described by Armstrong et al., *Macrmol. Reports*, A31 (*Suppl.* 6 & 7), 1299–306 (1994). Polymer gels and solutions of these polymers are known to undergo continuous or discontinuous volume change upon changes in temperature, solvent composition, pH or ionic composition. The driving forces for the phase change can be attractive or repulsive electrostatic interactions, hydrogen bonding or hydrophobic effects.

For nonionic synthetic polymers such as protein-based bioelastic materials, poly(N-isopropylacrylamide) and poly(ethylene glycol)-poly(propylene glycol) copolymers, as well as the polyether copolymers of the present invention, the driving force of the phase transition is the combination of hydrogen bonding and hydrophobic effect. As the temperature increases, the gels of these polymers undergo a phase transition from a swollen to a collapsed state, while polymer solutions precipitate at a certain temperature or within certain temperature ranges. These polymers, including the polyether copolymers of the present invention, and especially those that undergo a phase transition at about 30°–40° C. on heating can be used as biomaterials for drug release and clinical implantation materials. Specific applications include films and sheets for the prevention of adhesion and tissue reconstruction.

Therefore, the implantable medical devices containing the polyether copolymers of the present invention include the copolymer in the form of a sheet or a coating applied to exposed injured tissue for use as a barrier for the prevention of surgical adhesions as described by Urry et al., *Mat. Res. Ssc. Symp. Proc.*, 292, 253–64 (1994). The present invention thus also provides a method for preventing the formation of adhesions between injured tissues by inserting as a barrier between the injured tissues a sheet or a coating of the polyether copolymer of the present invention.

The hydrophilic/hydrophobic ratios of the polyethers of the present invention can be attenuated to vary the ability of the polyether coatings to modify cellular behavior. In addition to polyethers that inhibit cellular attachment, migration and proliferation to form anti-bacterial and non-thrombogenic coatings, the polymer hydrophilic/hydrophobic ratio can be adjusted to provide polyethers that form coatings that promote cellular attachment, migration and proliferation. Therefore, according to yet another aspect of the present invention, a method is provided for regulating cellular attachment, migration and proliferation by contacting living cells, tissues or biological fluids containing living cells with the polyethers of the present invention.

A more complete appreciation of the invention and many other intended advantages can be readily obtained by reference to the following detailed description of the preferred embodiment and claims, which disclose the principles of the invention and the best modes which are presently contemplated for carrying them out.

BEST MODES OF CARRYING OUT THE INVENTION

Polyethers according to the present invention are prepared by the reaction of activated poly(alkylene oxides) with aromatic diols. The preferred poly(alkylene oxide) is poly(ethylene oxide) (PEG). The polyethers are prepared by a solution polymerization process. The activated poly(alkylene oxide) preferably has the structure of Formula VI:

$$X—R_7(—O—R_7—)_mX \qquad (VI)$$

in which $R_7$ and m are the same as described above with respect to Formula I and X is an activating group capable of being displaced by a phenolate or a hydroxyl anion. $R_7$ is preferably an ethylene group and X is preferably selected from tosyl, mesyl, iodo, bromo, and chloro groups.

Activated poly(alkylene oxides) and their preparation are well-known to those of ordinary skill in the art. The preferred activated form of the poly(alkylene oxide) is the dichloride, in which X=Cl.

The aromatic diol preferably has the structure of Formula Ia:

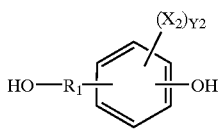

(Ia)

wherein $R_1$, $X_2$ and Y2 are the same as described above with respect to Formula I. A particularly preferred aromatic diol has the structure of Formula IIa:

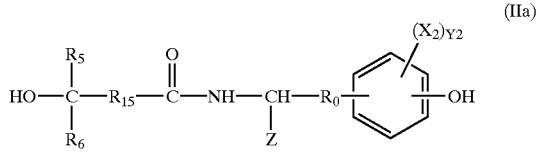

(IIa)

in which $R_0$, $R_5$, $R_6$, $R_{15}$, $X_2$, Y2 and Z are the same as described above with respect to Formula II, provided that Z is not hydrogen. Among the preferred aromatic diols of Formula IIa are compounds in which d and Y2 are 0 and $R_5$ and $R_6$ are independently selected from hydrogen and methyl. Z preferably has a structure according to Formula III in which L is an ethyl, butyl, hexyl, octyl or benzyl group. L is more preferably an ethyl group. When $R_5$ and $R_6$ are hydrogen and $R_{15}$ is (—$CH_2$—)$_c$, wherein c is 0, the aromatic diol is derived from glycolic acid. When $R_5$ is hydrogen and $R_6$ is methyl, and $R_{15}$ is again (—$CH_2$—)$_c$, wherein c is 0, the aromatic diol is derived from lactic acid. Aromatic diols derived from glycolic or lactic acid are particularly preferred. Aromatic diols having the structure of Formula II are prepared by coupling an α-, β- or γ-hydroxy acid with a phenolic compound according to the method described in International Application No. WO 98/36013, the disclosure of which is incorporated herein by reference. Preferred aromatic diols also include diphenol compounds having the structure of Formula IVa:

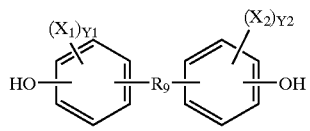

(IVa)

wherein $R_9$, $X_1$, $X_2$, Y1 and Y2 are the same as described above with respect to Formulas I and III.

$R_9$ preferably has the structure of Formula V. More preferably, $R_9$ has the structure of Formula V in which $R_4$ is (—$CH_2$—)$_a$, a and b are independently 1 or 2, and $R_2$ is an ethyl, butyl, hexyl, octyl or benzyl group. Most preferably, b is 2, d is 1 and $R_2$ is an ethyl group.

Methods for preparing the diphenol monomers of Formula IVa in which $R_9$ has the structure of Formula V are disclosed in commonly owned U.S. Pat. Nos. 5,587,507 and 5,670,602, the disclosures of both of which are incorporated herein by reference. The preferred diphenols are esters of desaminotyrosyl-tyrosine, with the preferred esters being ethyl, butyl, hexyl, octyl and benzyl esters. For purposes of the present invention, desaminotyrosyl-tyrosine ethyl ester is referred to as DTE, desaminotyrosyl-tyrosine benzyl ester is referred to as DTBn, and the like. The non-ester desaminotyrosyl-tyrosine free carboxylic acid is referred to as DT.

The Br and I substituted aromatic diols of the present invention are prepared by well-known iodination and bromination techniques that can be readily employed by those of ordinary skill in the art without undue experimentation to prepare the monomer compounds depicted in Formulas IIa and IVa. The substituted phenols from which the aromatic diols of the present invention are prepared undergo ortho-directed halogenation. For this reason, meta-iodinated and brominated aromatic diols are not readily prepared. Consequently, triiodo- and tribromophenol compounds have not been described. Such compounds are intended to be included within the scope of the present invention should a convenient method for their synthesis be discovered.

I and Br substituted diphenols may be prepared, for example, by coupling together two phenol compounds in which either or both of the phenol rings are I or Br substituted. For diphenol compounds in which $R_9$ of Formula IVa has the structure of Formula V, desaminotyrosyl-tyrosine esters may be prepared by the methods described in the above-incorporated U.S. Pat. Nos. 5,587,507 and 5,670,602 using desaminotyrosine and tyrosine alkyl esters in which either or both compounds are Br or I substituted. In a particularly preferred embodiment, desaminotyrosine is mono-iodinated at the ortho position on the phenolic ring and subsequently coupled with a tyrosine alkyl ester to obtain an iodine-substituted diphenol monomer.

I and Br substituted aromatic diols having the structure of Formula IIa are prepared by coupling an α-, β- or γ-hydroxy acid with a phenolic compound in which either or both of the hydroxy acid and the diphenol are I or Br substituted. For example, a tyrosine alkyl ester may be mono-iodinated at the ortho position on the phenolic ring and subsequently coupled with an α-, β- or γ-hydroxy acid according to the method described in the above-incorporated International Application No. WO 98/36013.

The aromatic diol and activated poly(alkylene oxide) are reacted in the presence of a reagent selected from metal hydroxides, metal hydrides, and metal alkoxides. The reagent is preferably an alkali metal hydroxide or alkoxide, such as sodium hydroxide.

Desirably, the reaction vessel should be purged and blanketed with an inert gas such a dry nitrogen or argon, to remove moisture. Essentially equimolar quantities of the aromatic diol and activated poly(alkylene oxide) should be used. The reaction time can be shortened by increasing the reagent concentration.

The reaction temperature should be higher than the solution freezing point and should not exceed the range of thermal stability of the resulting polyether. The reaction is typically performed at the reflux temperature of the reaction solvent. By increasing the reaction temperature, the reaction time is shortened. At the reflux temperature, the reaction typically goes substantially to completion within 24–48 hours. Desirably, the product polymer is recovered promptly after completion of the reaction by evaporation of the reaction solvent, followed by repeated washing and recovery by evaporation with excess methylene chloride.

Polyethers in accordance with the present invention have weight-average molecular weights between about 20,000 and about 400,000 daltons, and preferably have a weight-average molecular weight of about 100,000 daltons. The number-average molecular weights of the polyethers are preferably above 50,000 daltons. Molecular weight determinations are measured by GPC relative to PEG standards without further correction. The polyethers of the present invention having the structure of Formula I in which $R_1$ contains as part of its structure a pendent free carboxylic acid group are polymerized from aromatic diols having the structure of Formula Ia in which $R_1$ has an ester-protected carboxylic acid group to prevent cross-reaction with the activated poly(alkylene oxide). Because the resulting polyether linkage is hydrolytically stable, the ester protecting group can be removed by contacting the polyether with an alkali medium, to produce a polyether with polymer bound free carboxylic acid groups.

The free carboxylic acid groups may then be further derivatized to provide the polyether with desirable properties. Because of the hydrolytically stable polyether linkage, the polyethers of the present invention may be employed in a wide variety of derivatization reactions, providing the polymers with great versatility.

For example, the polyethers of the present invention having free carboxylic acid groups may be derivatized at the carboxylic acid groups with moieties that adjust the hydrophilic/hydrophobic ratio of the polyether to improve aqueous micelle self-formation and stability. For example, the hydrophobicity of the polyethers can be increased with the attachment of hydrophobic moieties such as cholesterol, stearylamine, and the like. Likewise, a more hydrophilic polymer without pendent free carboxylic acid groups can be obtained by attachment of hydrophilic moieties to the free carboxylic acid groups, such as ethanolamine. One of ordinary skill in the art, after reading the within specification, would be capable of adjusting the hydrophilic or hydrophobic properties of a polyether of the present invention within this range without undue experimentation.

The covalent bond by which hydrophilic or hydrophobic moieties are attached is an amide bond when in the underivatized moiety a primary or secondary amine is present at the position of the amide bond in the covalently attached moiety. The covalent bond is by means of an ester bond when in the underivatized moiety a primary hydroxyl is present at the position of the ester bond in the covalently attached moiety. Moieties may also be derivatized at a ketone, aldehyde or carboxylic acid group with a linkage group that is covalently bonded to the pendent free carboxylic acid by means of an amide or ester bond. The linkages defined by X in Formula IIIa may be employed to covalently bond moieties having a ketone, aldehyde or carboxylic acid group to the pendent free carboxylic acid group of the polyether by an amide or ester bond.

Detailed chemical procedures for the attachment of various moieties to polymer bound free carboxylic acid groups have been described in the literature. See, for example, U.S. Pat. Nos. 5,219,564 and 5,660,822; Nathan et al., *Bio. Cont. Chem.*, 4, 54–62 (1993) and Nathan, *Macromolecules*, 25, 4476 (1992). The disclosures of both patents and both journal articles are incorporated herein by reference. These publications disclose procedures by which polyethers having pendent free carboxylic acid groups are reacted with moieties having reactive functional groups, or that are derivatized to contain active functional groups, to form a polymer conjugate.

The order of reaction can also be reversed. The moiety may first be attached to an aromatic diol having a pendent free carboxylic acid group, which is then polymerized with an activated poly(alkylene oxide) to form a polyether in which 100% of the pendent free carboxylic acid groups have moieties attached thereto.

The aqueous dispersions are formed by blending appropriate quantities of polymer, drug and water at a temperature at which the individual components are stable. Other pharmaceutically acceptable carriers may be included as well. Acceptable pharmaceutical carriers for therapeutic use are well known in the pharmaceutical field, and are described, for example, in *Remington's Pharmaceutical Sciences*, Mack Publishing Co., (A. R. Gennaro edt. 1985).

Such materials are non-toxic to the recipients at the dosages and concentrations employed, and include diluents, solubilizers, lubricants, suspending agents, encapsulating materials, penetration enhancers, solvents, emollients, thickeners, dispersants, buffers such as phosphate, citrate, acetate and other organic acid salts, anti-oxidants such as ascorbic acid, preservatives, low molecular weight (less than about 10 residues) peptides such as polyarginine, proteins such as serum albumin, gelatin, or immunoglobulins, other hydrophilic polymers such as poly(vinylpyrrolidinone), amino acids such as glycine, glutamic acid, aspartic acid, or arginine, monosaccharides, disaccharides, and other carbohydrates, including cellulose or its derivatives, glucose, mannose, or dextrines, chelating agents such as EDTA, sugar alcohols such as mannitol or sorbitol, counterions such as sodium and/or nonionic surfactants such as tween, pluronics or PEG.

The dosage formulations of the aqueous dispersions must be sterile for therapeutic administration. Sterility is readily accomplished by filtration through sterile membranes or by other conventional methods. The pH of the dispersions of this invention typically will be between 3 and 11, and more preferably from 5 to 9.

Examples of hydrophobic drugs that are ably dispersed in aqueous media by the polyethers of the present invention include adriamycin, daunomycin, ibuprofen, steroids, and the like.

The polyethers of the present invention having pendent free carboxylic acid groups may also be derivatized at the carboxylic acid groups by the covalent attachment of a biologically or pharmaceutically active compound. The covalent bond is likewise by means of an amide bond when in the underivatized biologically or pharmaceutically active compound a primary or secondary amine is present at the position of the amide bond in the derivative. The covalent bond is likewise by means of an ester bond when in the underivatized biologically or pharmaceutically active compound a primary hydroxyl is present at the position of the ester bond in the derivative. The biologically or pharmaceutically active compounds may also be derivatized at a ketone, aldehyde or carboxylic acid group with a linkage moiety such as the linkage moiety $R_3$ of Formula IIIa, which is covalently bonded to the polyether carboxylic acid group by means of an amide or ester bond. The chemical attachment procedures described by the above-incorporated U.S. Pat. Nos. 5,219,564 and 5,660,822; Nathan et al., *Bio. Cong. Chem.*, 4, 54–62 (1993) and Nathan, *Macromolecules*, 25, 4476 (1992) are applicable here as well. And again, the biologically or pharmaceutically active compound may first be attached to the pendent free carboxylic acid group of the aromatic diol and then polymerized with the activated poly(alkylene oxide) to form a polyether in which 100% of the pendent free carboxylic acid groups have a biologically or pharmaceutically active compound covalently attached thereto.

When a polymer having pendent free carboxylic acid groups is first polymerized and then reacted with a biologically or pharmaceutically active compound or derivative thereof to form a polymer conjugate, not all of the pendent free carboxylic acid groups will have a biologically or pharmaceutically active compound covalently attached thereto, but a conjugate will be obtained in which biologically or pharmaceutically active compounds attach to at least about 25% of the pendent free carboxylic acid groups.

The drug-polymer compositions of the present invention, regardless of whether they are in the form of aqueous polymeric surfactant dispersions of hydrophobic drugs, polymer-drug conjugates or physical admixtures of polymer and drug, are suitable for applications where localized drug delivery is desired, as well as in situations where a systemic delivery is desired. The aqueous dispersions may be administered parenterally, intramuscularly or intravenously to a patient in need thereof, and the polymer-drug conjugates and physical admixtures may be implanted in the body of a patient in need thereof, by procedures that are essentially conventional and well-known to those of ordinary skill in the art.

Examples of biologically or pharmaceutically active compounds that may by covalently attached to the polyethers of the present invention include acyclovir, cephradine, malphalen, procaine, ephedrine, adriamycin, daunomycin, plumbagin, atropine, quinine, digoxin, quinidine, biologically active peptides, chlorin $e_6$, cephradine, cephalothin, proline and proline analogs such as cis-hydroxy-L-proline, malphalen, penicillin V, aspirin, nicotinic acid, chemodeoxycholic acid, chlorambucil, and the like. Biologically active compounds, for the purposes of the present invention, are additionally defined as including cell attachment mediators, biologically active ligands, and the like. Hydrolytically stable conjugates are utilized when the biological or pharmaceutical compound is active in conjugated form. Hydrolyzable conjugates are utilized when the biological or pharmaceutical compound is inactive in conjugated form. The properties of the poly(alkylene oxide) dominate the polyether and conjugate thereof.

Conjugates of the polyethers of the present invention with proline and proline analogs such as cis-hydroxy-L-proline may be used in the treatment methods disclosed in U.S. Pat. No. 5,660,822. The disclosure of this patent is incorporated herein by reference.

Drug delivery compounds may also be formed by physically blending the biologically or pharmaceutically active compound to be delivered with the polyethers of the present invention using conventional techniques well-known to those of ordinary skill in the art. For this drug delivery embodiment, it is not essential that the polyether have pendent free carboxylic acid groups.

The drug components to be incorporated in the polymer-drug conjugates and physical admixtures of this invention may be provided in a physiologically acceptable carrier, excipient stabilizer, etc., and may be provided in sustained release or timed release formulations supplemental to the polymeric formulation prepared in this invention. The carriers and diluents listed above for aqueous dispersions are also suitable for use with the polymer-drug conjugates and physical admixtures.

The dosage formulations of polymer-drug conjugates and physical admixtures of this invention to be used for therapeutic administration must also be sterile. Sterility may be readily accomplished by conventional methods such as irradiation or treatment with gases or heat. Liquid components may be sterilized by filtration through sterile membranes.

Subjects in need of treatment, typically mammalian, using the polymer-drug combinations of this invention, can be administered drug dosages that will provide optimal efficacy. The dose and method of administration will vary from subject to subject and be dependent upon such factors as the type of mammal being treated, its sex, weight, diet, concurrent medication, overall clinical condition, the particular compounds employed, the specific use for which these compounds are employed, and other factors which those skilled in the medical arts will recognize. The polymer-drug combinations of this invention may be prepared for storage under conditions suitable for the preservation of drug activity as well as maintaining the integrity of the polymers, and are typically suitable for storage at ambient or refrigerated temperatures.

The polymer-drug combinations may also be administered subcutaneously, colonically, rectally, or nasally, employing a variety of dosage forms such as suppositories, implanted pellets or small cylinders, aerosols, oral dosage formulations and topical formulations such as ointments, drops, tablets, capsules, oral liquids and solutions, parenteral solutions and suspensions, oral powders, topical solutions, suspensions, emulsions, creams, lotions, transdermal liquids and the like. Aerosol preparations are typically suitable for nasal or oral inhalation, and may be in powder or solution form, in combination with a compressed gas, typically compressed air. Additionally, aerosols may be used topically. In general, topical preparations may be formulated to enable one to apply the appropriate dosage to the affected area once daily, and up to three to four times daily, as appropriate.

Depending upon the particular compound selected, transdermal delivery may be an option, providing a relatively steady delivery of the drug, which is preferred in some circumstances. Transdermal delivery typically involves the use of a compound in solution, with an alcoholic vehicle, optionally a penetration enhancer, such as a surfactant, and other optional ingredients. Matrix and reservoir type transdermal delivery systems are examples of suitable transdermal systems. Transdermal delivery differs from conventional topical treatment in that the dosage form delivers a systemic dose of the drug to the patient.

The polymer-drug formulations of this invention may also be administered in the form of liposome delivery systems, such as small unilamellar vesicles, large unilamellar vesicles and multilamellar vesicles. Liposomes may be used in any of the appropriate routes of administration described herein. For example, liposomes may be formulated that can be administered orally, parenterally, transdermally, or via inhalation. Drug toxicity could thus be reduced by selective drug delivery to the affected site. For example, if the drug is liposome encapsulated, and is injected intravenously, the liposomes used are taken up by vascular cells and locally high concentrations of the drug could be released over time within the blood vessel wall, resulting in improved drug action. The liposome encapsulated drugs are preferably administered parenterally, and particularly, by intravenous injection.

Liposomes may be targeted to a particular site for drug release. This would obviate excessive dosages that are often necessary to provide a therapeutically useful dosage of a drug at the site of activity, and consequently, the toxicity and side effects associated with higher dosages.

The drugs incorporated into the polymers of this invention may desirably further incorporate agents to facilitate their delivery systemically to the desired drug target, as long as the delivery agent meets the same eligibility criteria as the drugs described above. The active drugs to be delivered may in this fashion be incorporated with antibodies, antibody fragments, growth factors, hormones, or other targeting moieties, to which the drug molecules are coupled. The polymer-drug combinations of this invention may be formed into shaped particles, such as valves, stents, tubing, prostheses, and the like.

Therapeutically effective dosages may be determined by either in vitro or in vivo methods. For each particular compound of the present invention, individual determinations may be made to determine the optimal dosage required.

The range of therapeutically effective dosages will naturally be influenced by the route of administration, the therapeutic objectives, and the condition of the patient. For the various suitable routes of administration, the absorption efficiency must be individually determined for each drug by methods well known in pharmacology. Accordingly, it may be necessary for the therapist to titer the dosage and modify the route of administration as required to obtain the optimal therapeutic effect. The determination of effective dosage levels, that is, the dosage levels necessary to achieve the desired result, will be within the ambit of one skilled in the art. Typically, applications of compound are commenced at lower dosage levels, with dosage levels being increased until the desired effect is achieved. The release rate of the drug from the formulations of this invention are also varied within the routine skill in the art to determine an advantageous profile, depending on the therapeutic conditions to be treated.

A typical dosage might range from about 0.001 mg/k/g to about 1,000 mg/k/g, preferably from about 0.01 mg/k/g to about 100 mg/k/g, and more preferably from about 0.10 mg/k/g to about 20 mg/k/g. Advantageously, the compounds of this invention may be administered several times daily, and other dosage regimens may also be useful.

In practicing the methods of this invention, the polymer-drug combinations may be used alone or in combination with other therapeutic or diagnostic agents. The compounds of this invention can be utilized in vivo, ordinarily in mammals such as primates such as humans, sheep, horses, cattle, pigs, dogs, cats, rats and mice, or in vitro.

The polymers of the present invention also find application in areas where both solid materials and solvent-soluble materials are commonly employed. Such applications include polymeric scaffolds in tissue engineering applications and medical implant applications, including the use of the polyethers of the present invention to form shaped articles such as vascular grafts and stents, bone plates, sutures, implantable sensors, scaffolds for tissue regeneration, and other therapeutic agent particles that decompose harmlessly within a known period of time. Shaped particles can be formed by conventional techniques such as extrusion, compression molding, injection molding, solvent casting, spin casting, and the like.

The polyethers of the present invention are soluble in both water and organic media. Accordingly, they can be processed by solvent casting techniques and are good film formers.

As noted above, because of the poly(alkylene oxide) content, the polyethers of the present invention are resistant to cell attachment and thus are useful as non-thrombogenic coatings on surfaces in contact with blood, and as coatings on surfaces to provide resistance to bacterial adhesion, where needed. The polymers thus can be formed as a coating on the surface of medical devices by conventional dipping or spray coating techniques to prevent the formation of blood clots for the adhesion of bacteria on the surface of the device.

The film forming properties of the polyethers of the present invention can be advantageously combined with the resistance to cell attachment to provide films for use as barriers for the prevention of surgical adhesions. A coating of the polyether of the present invention may also be applied to injured tissue to provide a surgical adhesion barrier.

INDUSTRIAL APPLICABILITY

Shaped articles may be prepared from the polyethers of the present invention for medical implant and drug delivery applications. The polyethers of the present invention may also be used as polymeric surfactants in the preparation of stable aqueous dispersions of hydrophobic drugs.

The following non-limiting examples set forth hereinbelow illustrate certain aspects of the invention. All parts and percentages are by weight unless otherwise noted and all temperatures in are in degrees Celsius.

EXAMPLES

The following examples illustrate the preparation of PEG diphenol polyether copolymers. Examples 1 through 4 illustrate various chemical methodologies that can be used. In these examples, poly(PEG-bisphenol-A ether) is prepared to illustrate the utility of the various chemical methodologies. In examples 5 to 7, these methodologies are used to prepare polymers that contain pendent chains that are either esters of, or free, carboxylic acid groups.

Example 1

Poly(PEG-bisphenol-A ether) by Solution Polymerization

This material is a copolymer of bisphenol A and poly (ethylene glycol). This example illustrates the "solution method" developed. The methodology is useful in general for the preparation of a wide range of PEG containing polyethers.

Step 1: Preparation of a α, ω-Dichloro-PEG-2000.

In a 500 mL round-bottomed flask was placed 50 g (0.025 mol) of PEG2000 and stirred with 30 mL (0.4 mol) of thionyl chloride at about 65° C. for 40 h. The reaction mixture was cooled to room temperature and precipitated with 500 mL of ether. The product was isolated by filtration and washed with 50 mL of ether. The product was purified by recrystallization from 400 mL isopropanol. The $^{13}$C NMR spectrum (CDCl$_3$) of the product showed a multiplet at 70.98–71.75 ppm (Internal methylenes) and a singlet at 43.16 ppm corresponding to CH$_2$—OH. A singlet at 62.16 ppm corresponding to CH$_2$—OH was not detected showing complete conversion of the OH to Cl.

Step 2: Reaction of a α, ω-Dichloro-PEG-2000 with bisphenol A resulting information of Poly(PEG-bisphenol-A ether).

In a 25 mL round-bottomed flask equipped with a reflux condenser were placed α, ω-Dichloro-PEG-2000. (3.9 g, 2 mmol), bisphenol A (0.46 g, 2 mmol) and 0.95 M sodium hydroxide (4.3 mL, 4.1 mmol). The reaction mixture was refluxed for 65 h under a nitrogen atmosphere, allowed to cool to room temperature, acidified with diluted HCl to pH 3, and then extracted with two 10 mL portions of methylene chloride. The organic layer was dried over magnesium sulfate, evaporated to dryness and then dried under vacuum. The white crystalline solid was characterized by $^1$H NMR, DSC, and GPC. DSC showed a Tg of –50° C. and a Tm of 37° C. GPC showed a Mw of 25,000 with a polydispersity of 1.5. $^1$H NMR spectrum (CDCl$_3$) showed two doublets at 7.10 and 6.80 ppm (4H each, Ar—H), 4.0 (m, 4H, Ar—O—CH$_2$), 3.2 to 3.8 (internal CH$_2$'s of PEG), and 1.6 (s, 6H, C—CH$_3$).

Example 2

Preparation of Poly(PEG-bisphenol A Ether) by Melt Polymerization Using Cesium Fluoride In this example, the same polymer is prepared as in Example 1; however, a different chemical method was used. As before, α, ω-dichloro-PEG-2000 was prepared in step 1 (see example 1), then, in step 2, a melt polymerization was used.

Step 2: Reaction of α, ω-Dichloro-PEG-2000 with Bisphenol A in the Melt and in the Presence of Cesium Fluoride Resulting in Formation of Poly(PEG-bisphenol-A ether).

A 100 mL, three-necked round-bottomed flask was equipped with an overhead stirrer, and charged with 3.794 g (2 mmoles) of PEG dichloride, 0.456 g (2 mmoles) of bisphenol-A, and 1.519 g (10 mmoles) of cesium fluoride. The solids were mixed at slow speed, then the flask was placed in an oil bath and the temperature was raised until the solids melted. The flask was then connected to a mechanical pump, and the mixture was melt dried for 10 minutes. The apparatus was then connected to a nitrogen inlet, and stirring was continued at 80° C. for six days, periodically checking the progress of the polymerization by GPC. The mixture was then stirred in methylene chloride, the inorganic salts were filtered off, the solvent was evaporated out by rotary evaporation, and the residue was recrystallized in isopropanol. The product was dried first under a stream of nitrogen, then under high vacuum.

Characterization: $^{13}$C NMR confirmed polymer structure. Molecular weight determined by GPC in Dimethylformamide/LiBr 0.1% vs. PEG standards: Mw=15,000 g/mole; Mn=9,945 g/mole.

Example 3

Preparation of Poly(PEG-bisphenol A Ether) by Solution Polymerization Using Cesium Fluoride In this example, the same polymer as described in Example 1 is prepared, only cesium fluoride was used as the catalyst instead of the commonly used sodium hydroxide. The use of cesium fluoride can have advantages when the polymerization involves chemical structures that would be sensitive to the presence of the strongly basic sodium hydroxide.

A 100 mL, three-necked round-bottomed flask was equipped with a magnetic bar, a reflux condenser, an addition funnel, and a calcium chloride tube. The apparatus was flame dried and allowed to cool under a nitrogen stream. The flask was then charged with 1.519 g (10 mmoles) of cesium fluoride, 0.456 g (2 mmoles) of bisphenol A and 5 ml of acetonitrile previously dried on 3A molecular sieves. A solution of 3.794 g (2 mmoles) α, ω-dichloro-PEG in 10 ml of dried acetonitrile was transferred in the addition funnel. The mixture was heated to reflux in a heating mantle. When reflux started, the α, ω)-dichloro-PEG solution was dropped from the addition funnel over a period of 30 min. The reaction was continued under nitrogen and at reflux temperature for two weeks, checking periodically the progress of the polymerization by GPC. After two weeks, the acetonitrile was evaporated out by rotary evaporation, the residue was stirred in ethyl ether, and the ether was decanted. The solid was dried briefly under nitrogen stream, and then recrystallized in absolute ethanol. It was collected in a buchner funnel, dried overnight under nitrogen stream, then transferred in high vacuum.

Characterization: $^{13}$C NMR confirmed by polymer structure. Molecular weight determined by GPC in Dimethylformamide vs. PEG standards: Mw=8,700 g/mole; Mn=6,300 g/mole.

Example 4

Preparation of Poly(PEG-bisphenol A Ether) by Solution Polymerization Using Powdered Potassium Hydroxide in Acetonitrile and PEG Dimesylate In example 4, the use of a different activated PEG derivative was explored. Also, while in Example 1, aqueous sodium hydroxide was used, here the reaction was carried out under non-aqueous conditions. Instead of α, ω-dichloro-PEG, α, ω-dimesylate-PEG was prepared in step 1 and then reacted with bisphenol A in step 2.

Step 1: Preparation of α, ω-dimesylate-PEG-2000.

30 g (15 mmoles) of PEG 2000 were weighed in a 200 ml, one-necked round-bottomed flask. The flask was heated with a heating mantle until the PEG melted, then it was connected to a mechanical pump for half an hour in order to melt-dry the material. The flask was cooled, and 100 ml of methylene chloride were added. The mixture was stirred until the PEG was completely dissolved, then the flask was placed in an ice-water bath, and 8.35 ml (60 mmoles) of triethylannine were added. 6.97 ml (90 mmoles) of mesyl chloride were then added dropwise over a period of 10 minutes. The reaction was allowed to continue overnight at 0° C., then the solution was filtered twice through fluted filter paper, and evaporated to dryness. The product was recrystallized in isopropanol, and then in absolute ethanol. It was collected in a buchner funnel and washed three times with hexane. It was dried under a stream of nitrogen, and then under high vacuum. Reaction completion was checked by $^{13}$C NMR.

Step 2: Reaction of αα, ω-Dimesylate-PEG2000 with Bisphenol A in Acetonitrile in the Presence of Powdered Potassium Hydroxide Resulting in Formation of Poly(PEG-bisphenol-A Ether).

0.251 g (5 mmoles) of powdered KOH were weighed in a two-necked, 50 ml round-bottomed flask. The flask was then equipped with a stirring bar, a calcium chloride tube and a nitrogen inlet. It was flame dried and allowed to cool under a stream of nitrogen. The KOH was easily crushed into a powder, then 1.987 g (1 mmole) of PEG dimesylate, 0.228 g (1 mmole) of Bisphenol A, and 15 ml of acetonitrile previously dried on 3A molecular sieves were added. The mixture was placed in an oil bath heated to 65° C. After 4 hours, the progress of the reaction was checked by GPC. No monomeric material was detected by GPC. The mixture was carefully neutralized with 0.4 M HCl/20% NaCl. The acetonitrile was evaporated out, and the product was extracted with four portions of methylene chloride. The organic phase was dried over magnesium sulphate, and the solids were eliminated by vacuum filtration. The filtrate was evaporated to dryness, and the product was recrystallized in isopropanol, then dried under a stream of nitrogen and then under high vacuum.

Molecular weight determined by GPC in Dimethylformamide/LiBr 0.1% vs. PEG standards: Mw=41,000 g/mole; Mn=27,040 g/mole.

When this reaction was repeated in dimethylsulphoxide (DMSO), the reaction was slower, reaching completion only after 30 hours, and the molecular weight of the final product was lower (Mw=30,600 g/mole; Mn=19, 100 g/mole).

Example 5

Poly(PEG-diphenolic Acid Ether)

In example 5, the methodology illustrated in example 1 is used to prepare a polymer with a pendent carboxylic acid group by using a diphenolic acid instead of bisphenol A. As before, in step 1, α, ω-dichloroPEG2000 is prepared. In step 2, this activated derivative of PEG is reacted with a diphenolic acid to produce the target polymer, a poly(PEG-diphenolic acid ether).

Step 1: See Example 1.

Step 2: Reaction of α, ω-Dichloro-PEG-2000 with Diphenolic Acid Resulting in Formation of Poly(PEG-diphenolic Acid Ether).

In a 25 mL round-bottomed flask equipped with a reflux condenser were placed α, ω-dichloro-PEG-2000 (3.9 g, 2 mmole) 4,4[1]-(γ-,γ-valeric acid) diphenol (0.57 g, 2 mmol) and 0.95 M sodium hydroxide (6.5 mL, 4.1 mmol). The reaction mixture was refluxed for 65 h under a nitrogen atmosphere, allowed to cool to room temperature, acidified with dil HCl to pH 3, and then evaporated to dryness. The residue was extracted with two 10 mL portions of methylene chloride. The organic layer was dried over magnesium sulfate, evaporated to dryness, and then dried under vacuum. The white crystalline solid was characterized by $^1$H NMR, DSC, and GPC. GPC with THF as mobile phase showed a Mw of 13,000 with a polydispersity of 1.5. DSC showed a Tg of −9.9° C. and a Tm of 42.7° C. $^1$H NMR spectrum (CDCl$_3$) showed two doublets at 6.95 and 6.60 ppm (4H each, Ar—H), 4.0 (m, 4H, Ar—O—CH$_2$), 3.2 to 3.8 (internal CH$_2$'s of PEG), 2.2 (br m, 2H, CH$_2$CO), 1.9 (br m, 2H, C—CH$_2$) and 1.4 (s, 3H, C—CH$_3$).

Example 6

Preparation of Poly(PEG-DTE Ether) by Melt Polymerization Using Cesium Fluoride

In this example, the methodology described in Example 2 was used to copolymerize a tyrosine-derived diphenolic monomer, desaminotyrosyl-tyrosine ethyl ester with a α, ω-Dichloro-PEG-2000 to obtain a peptide-PEG polyether that carried an ester-protected pendent chain at each monomeric repeat unit. As before, in step 1, (see example 1), the activated α, ω-Dichloro-PEG-2000 was prepared. In step 2 (see below), this active PEG derivative was reacted with desaminotyrosyl-tyrosine ethyl ester to obtain the target polymer.

A 100 ml, three-necked round-bottomed flask was equipped with an overhead stirrer, and charged with 3.794 g (2 mmoles) of PEG dichloride, 0.710 g (2 mmoles) of DTE, and 1.519 g (10 mmoles) of cesium fluoride. The solids were mixed at slow speed, then the flask was placed in an oil bath and the temperature was raised until the solids melted. The flask was then connected to a mechanical pump, and the mixture was melt dried for 10 minutes. The apparatus was connected to a nitrogen inlet, and stirring was continued at 80° C. for five days, periodically checking the progress of the polymerization by GPC. The mixture was then stirred in methylene chloride, the inorganic salts were filtered off, the solvent was evaporated out by rotary evaporation, and the residue was recrystallized twice in isopropanol. The product was dried first under a stream of nitrogen, then under high vacuum.

Characterization: $^1$H NMR confirmed polymer structure, and showed no significant cleavage of the ester bond in the DTE units. Molecular weight determined by GPC in Dimethylformamide/LiBr 0.1% vs. PEG standards: Mw=18,200 g/mole; Mn=9,900 g/mole.

Example 7

Preparation of Poly(PEG-DT Ether) by Solution Polymerization Using Powdered Potassium Hydroxide in Acetonitrile and PEG Dimesylate In this example, the methodology illustrated in Example 4 is used to prepare a functionalized copolyether of PEG and desaminotyrosyl-tyrosine ethyl ester. In step 1, α, ω-Dimesylate-PEG-2000 is prepared as shown in Example 4. In step 2, the activated PEG is contacted with DTE. During the polymerization/work up, the ethyl ester pendent chain is cleaved. This is due to the presence of a large excess of potassium hydroxide. Thus, free carboxylic acid groups are generated at each monomeric repeat unit, resulting in the formation of poly(PEG-DT ether). Note that this is in contrast to Example 6, where the use of cesium fluoride prevented concomitant hydrolysis of the pendent ester groups during polymerization.

Step 1: See Example 4.

Step 2: Reaction of α, ω-Dimesylate-PEG-200 with DTE in Acetonitrile in the presence of Powdered Potassium Hydroxide Resulting in Formation of Poly(PEGDT Ether).

0.251 g (5 mmoles) of powdered KOH were weighed in a two-necked, 50 ml round-bottomed flask. The flask was then equipped with a stirring bar, a calcium chloride tube and a nitrogen inlet. It was flame dried and allowed to cool under a stream of nitrogen. The KOH was easily crushed into a powder, then 1.987 g (1 mmole) of α, ω-Dimesylate-PEG-2000, 0.357 g (1 mmole) of DTE, and 15 ml of acetonitrile previously dried on 3A molecular sieves were added. The mixture was placed in a oil bath heated to 65° C. The polymerization progress was checked by GPC. After 26 hours, the inorganic salts were filtered off by vacuum filtration, and the filtrates were diluted with 75 ml methylene chloride. The organic phase was transferred in a separatory funnel and extracted once with 25 ml 0,4M HCl/20% NaCl, then with 20% NaCl. The organic phase was dried over magnesium sulphate, the solid was filtered off, and the filtrates were evaporated to dryness. The residue was recrystallized in isopropanol, collected in a buchner funnel and washed twice with hexane. It was finally dried under a stream of nitrogen, and then under high vacuum.

Characterization: $^1$H NMR showed complete cleavage of the ester bond in the DTE unit. Molecular weight determined by GPC in dimethylformamide/LiBr 0.1% vs. PEG standards: Mw=17,100 g/mole; Mn=11,600 g/mole.

Example 8

Poly(DiTE-PEG2K Ether) by Solution Polymerization

This material is an alternating copolymer of PEG2000 and DiTE(3-iodophenyl DTE), i.e., 3-(3-iodo-4-hydroxyphenyl) propionic acid. The polymerization takes place by formulation of an ether linkage between the phenolic OH groups of DiTE, and the activated chain ends of PEG. In this Example, the activated PEG derivative is α, ω-dimethanesulfonyl-PEG2000, prepared in Step 1. In Step 2, the PEG derivative is reacted with DiTE in order to obtain the target polymer.

Step 1: Preparation of α-, ω-Dimethanesulfonyl-PEG2000

30 g (15 mmoles) of PEG2000 were weighed in a 200 mL, one-necked round-bottomed flask. The flask was heated with a heating mantle until the PEG was melted, then it was connected to a mechanical pump for half an hour in order to melt-dry the material. The flask was cooled, and 100 mL of methylene chloride were added. The mixture was stirred until the PEG was completely dissolved, then the flask was placed in an ice-water bath, and 8.35 mL (60 mmoles) of triethylamine were added. 6.97 mL (90 mmoles) of methanesulfonyl chloride were then added dropwise over a period of 10 minutes. The reaction was allowed to continue overnight at 0° C., then the solution was filtered twice through fluted filter paper, and evaporated to dryness. The product was recrystallized in isopropanol, and then in absolute ethanol. It was collected in a buchner funnel, and washed three times with hexane. It was dried under a stream of nitrogen, and then under high vacuum.

Characterization: The $^{13}$C NMR spectrum (CDCl$_3$) of the product showed a multiplet at 70.98–71.75 ppm (internal methylenes) and a singlet at 38.0 ppm corresponding to CH$_2$—OMs. A singlet at 62.16 ppm corresponding to CH$_2$—OH was not detected showing complete conversion of the OH to OMs.

Step 2: Reaction of α-, ω-Dimethanesulfonyl-PEG2000 with DiTE in Acetonitrile in the Presence of Anhydrous Potassium Hydroxide.

A 100 mL two-necked round-bottomed flask equipped with a reflux condenser and a mechanical stirrer was purged with nitrogen for 1.5 hours, and then it was charged with 4.034 g (2 mmoles) of α-, ω-dimethanesulfonyl-PEG2000, 0.966 g (2 mmoles) of DiTE, 0.296 g (4.8 mmoles) of powdered, anhydrous potassium hydroxide, and 4 mL of dry acetonitrile. The flask was heated in an oil bath at 70° C., and the mixture was stirred to low speed for 48 hours. The mixture was diluted with 80 mL methylene chloride, then the turbid solution was filtered under reduced pressure through coarse and then finer filter paper, followed by 5μ and 1μ syringe filters. The solvent was thoroughly evaporated under high vacuum, and the residue was crystallized in isopropanol, isolated by filtration, and dried under a nitrogen stream followed by high vacuum.

Characterization: A Mw of 20,400 with a polydispersity of 2.2 was determined by GPC vs. PEG standards, with DMF/LiBr 0.1% as the mobile phase. $^1$H—NMR (DMSO-D$_6$) showed the following peaks (ppm): 1.11 (t, 3H), 2.35 (t, 2H), 2.67 (m, 2H), 2.85 (m, 2H), 3.5 (internal PEG methylenes), 4.1 (terminal PEG methylenes and 2H from ethyl ester groups) 4.4 (m, 1H), 6.8 to 7.2 (m, 6H), 7.1 (s, 1H), 8.25 (m, 1H).

Example 9

Preparation of Poly(PEG-DTE Ether) by Solution Polymerization Using Anhydrous Potassium Hydroxide in Acetonitrile and α-, ω-Dimethanesulfonyl-PEG2000

In this example, a method similar to the one illustrated in Example 7 is used in order to obtain Poly(PEG-DTE ether). In this case, a smaller excess of anhydrous potassium hydroxide is used, and the product is purified by means of a non-aqueous workup. As a result, the ethyl pendent chain is preserved.

Step 1: See Example 4.

Step 2: Reaction of α-, ω-Dimethanesulfonyl-PEG2000 with DTE in Acetonitrile in the Presence of Powdered Potassium Hydroxide Resulting in Formation of Poly(PEG-DTE Ether).

A 100 mL two-necked round-bottomed flask equipped with a reflux condenser and a mechanical stirrer was purged with nitrogen for 1.5 hours, then it was charged with 4.034 g (2 mmoles) of α-, ω-dimethylsulfonyl-PEG2000, 0.714 g (2 mmoles) of DTE, 0.296 g (4.8 mmoles) of powdered, anhydrous potassium hydroxide, and 4 mL of dry acetonitrile. The flask was heated in an oil bath at 70° C., and the mixture was stirred at low speed for 48 hours. 80 mL methylene chloride were added, then the turbid solution was filtered under reduced pressure through coarse and then finer filter paper, followed by 5μ and 1μ syringe filters. The solvent was thoroughly evaporated under high vacuum, and the residue was recrystallized in isopropanol, isolated by filtration, and dried under a nitrogen stream followed by high vacuum.

Characterization: The $^1$H NMR confirmed polymer structure, and showed no significant cleavage of the ester bond in the DTE units. Molecular weight determined by GPC in Dimethylformamide/LiBr 0.1% vs. PEG standards: Mw=27,000; Mn=11,000.

Example 10

Attachment of cis-Hydroxy-L-Proline to the Free Carboxylic Acid Groups of Poly(PEG-DT Ether) by Hydrolytically Stable Amide Linkages In this example, the amino acid cis-hydroxy-L-proline is attached through amide linkage to the free carboxylic acid groups of poly(PEG2K-DT ether).

A 100 mL one-necked round-bottomed flask was charged with 3.2 g (1.4 mmoles of repeating units) of poly(PEG2K-DT ether) (Example 5), 0.546 g (2.8 mmoles) cis-hydroxy-L-proline ethyl ester hydrochloride, and 30 mL acetonitrile. The flask was cooled in an ice-water bath, then 0.467 ml (3.35 mmoles) of triethylamine, 0.572 g (4.2 mmoles) of 1-hydroxy-7-azabentotriazole, and 0.645 g (3.35 mmoles) of EDCl HCl were added. Stirring was continued overnight, allowing the reaction mixture to slowly reach room temperature. The solvent was then evaporated, and the residue was treated with 10 ml NaOH 0.5 M at 50° C. for half an hour. The solution was cooled and carefully acidified to litmus with concentrated HCl, then the product was extracted with four 100 ml portions of methylene chloride. The organic phase was dried over magnesium sulfate, decanted, concentrated to half its volume and filtered through a thin layer of silica gel. The solvent was removed by rotary evaporation, the residue was triturated in ethyl ether, and the product was isolated by filtration.

Characterization: $^1$H-NMR confirmed polymer structure and attachment of cis-4-hydroxy-L-proline. The percent attachment, determined by amino acid analysis with L-Valine as the internal standard, was 92.6%.

Example 11

Synthesis of DT-Hydroxyprolylamide Ethyl Ester

DT-hydroxyprolylamide ester is a monomeric bisphenol of the DTR type, where R is 4-hydroxy-L-proline ethyl ester, an ester-protected amino acid derivative. In this example, the synthesis of this monomer is illustrated. The same procedure can be applied to both the cis and trans isomers of hydroxyproline.

Step 1: 4hydroxy-L-proline ethyl ester hydrochloride.

200 mL of absolute ethanol were placed in a 500-mL one-necked round-bottomed flask equipped with an addition funnel. The flask was then cooled in a dry ice/acetone bath, then 17 mL (0.23 mmoles) of thionyl chloride were added from the addition funnel over a 10 minute period. The funnel was removed, and 26.2 g (0.20 mmoles) of 4-hydroxyproline were added in one portion while stirring. The flask was equipped with a reflux condenser and a sodium hydroxide trap, and the mixture was refluxed for two hours. The product was precipitated in ether, isolated by filtration, and washed three times with ether, then it was dried under a stream of nitrogen followed by high vacuum.

Characterization: Proton NMR in DMSO-D$_6$ confirmed the structure.

Step 2: N-t-BOC-O-Bn-Tyrosine-Hydroxyprolylamide Ethyl Ester ("BOC-Bn-Tyr-Hyp-OEt").

A 250 mL one-necked round-bottomed flask was charged with 3.714 g (10 mmoles) N-t-BOC-O-Bn-Tyrosine and 2.145 g (11 mmoles) HypOEi HCl. 30 mL acetonitrile were added, the flask was cooled in an ice-water bath, then 1.53 mL (11 mmoles) triethylamine, 1.62 g (12 mmoles) HOBt monohydrate, and 2.312 g (12 mmoles) EDCI HCl were added. The cooling bath was maintained for 1 h, 30 min., then the mixture was kept at room temperature for 1 h, 30 min. 300 mL ethyl acetate were added, and the reaction crude was washed with citric acid, 0.1 M/NaCl 20%, NaHCO3 3%/NaCl 20%, and NaCl 20%. The organic phase was dried over magnesium sulfate, filtered and the solvent was evaporated to dryness.

Characterization: Proton NMR is DMSO-$D_6$ confirmed the structure.

Step 3: O-Bn-Tyrosine-4-Hydroxyprolylamide Ethyl Ester Hydrochloride ("Bn-Tyr-Hyp-OEt").

5 g (9.8 mmoles) N-BOC-Bn-Tyr-Hyp OEt and 95 mL absolute ethanol were placed in a 250 mL one-necked round-bottomed flask. The flask was placed in an ice-water bath, and HCl gas was bubbled very slowly in the solution (1–2 bubbles/second) for 10 minutes. The mixture was purged by bubbling dry nitrogen vigorously for a half hour, then the solvent was removed to dryness under reduced pressure. The product was triturated and washed in ethyl ether, then it was isolated by filtration and dried under a stream of nitrogen, followed by high vacuum.

Characterization: Proton NMR in DMSO-$D_6$ confirmed the structure. Product purity was checked by reverse-phase HPLC.

Step 4: Desaminotyrosol-Bn-Hydroxyprolylamide Ethyl Ester ("Bn-DTHypOEt").

A 100 mL one necked round-bottomed flask was charged with 3.80 g (8.5 mmoles) Bn-Tyr-Hyp-OEt and 1.41 g (8.5 mmoles) desaminotyrosine. 30 mL acetonitrile were added, the flask was cooled in an ice-water bath, then 1.18 mL (8.5 mmoles) triethylamine, 1.26 g (9.4 mmoles) HOBt monohydrate, and 1.80 g (9.4 mmoles) EDCI HCl were added. The cooling bath was maintained for 1 h, 30 min., then the mixture was kept at room temperature for 1 h, 30 min. 300 mL ethyl acetate were added, and the reaction crude was washed with HCl 0.4 M/NaCl 20%, NaHCO3 3%/NaCl 20%, and NaCl 20%. The organic phase was dried over magnesium sulfate, filtered and the solvent was evaporated to dryness.

Characterization: Proton NMR in DMSO-$D_6$ confirmed the structure. Product purity was checked by reverse-phase HPLC.

Step 5: Desaminotyrosyl-Tyrosine-Hydroxyprolylamide Ethyl Ester ("DTcHyp OEt and DTtHyp OEt").

The benzyl protecting group of Bn-DTcHyp OEt or Bn-DTtHyp OEt was removed by catalytic hydrogenation in absolute ethanol. 4.5 g of Bn-DTcHyp OEt or Bn-DTtHyp OEt were dissolved in 45 mL of absolute ethanol, 4.5 g of 5% palladium on activated charcoal was added, and the suspension was placed in a hydrogenation apparatus under 60 psi of hydrogen for a few hours. Reaction completion was checked by reverse-phase HPLC. The solid catalyst was removed by filtration through 1 µm and 0.45 µm syringe filters, then the solvent was evaporated to dryness under reduced pressure.

Characterization: Proton NMR in DMSO-$D_6$ confirmed the structure. Product purity was checked by reverse-phase HPLC.

Example 12

Preparation of Poly(PEG-DT-Hyp Ether) by Solution Polymerization Using Anhydrous Potassium Carbonate in Acetonitrile and α-, ω-Dimethanesulphonyl-PEG2000.

In this example, the methodology illustrated in Example 4 is used to prepare poly(PEG-DT-Hyp ether). The same methodology can be used for both DTcHyp OEt and DTtHyp OEt. As before, α-, ω-dimethanesulphonyl-PEG2000 is prepared in Step 1, then in Step 2 the active PEG derivative is reacted with desaminotyrosyl-tyrosine-Hyp ester to obtain the target polymer.

Step 1: See Example 4.

Step 2: Reaction of α-, ω-Dimethanesulphonyl-PEG2000 with DT-Hyp OEt in Acetonitrile in the Presence of Anhydrous Potassium Carbonate Resulting in Formation of Poly (PEGDT-Hyp Ether).

A 50 mL two-necked round-bottomed flask was equipped with a magnetic bar, a reflux condenser, and a thermometer. It was flame-dried, and allowed to cool under a stream of nitrogen, then it was charged with 0.345 g (2.5 mmoles) of potassium carbonate, 0.250 (0.5 mmoles) of DT-HypOEt (Example 11), 0.99 g (0.5 mmoles) of α-, ω-dimethanesulphonyl-PEG2000, and 7 mL of acetonitrile previously dried on 3A molecular sieves. The mixture was heated to 65° C. in a nitrogen atmosphere, and stirring was continued for four days, then the solvent was evaporated out, and the residue was stirred with 6 mL of NaOH 1 M at 50° C. for a half hour. The mixture was carefully acidified to litmus with concentrated HCl, then the product was extracted with methylene chloride, the organic phase was treated with magnesium sulfate and charcoal, and filtered through a thin layer of silica gel. The solvent was removed under reduced pressure.

Characterization: $^1$H NMR spectrum (DMSO-$D_6$) confirmed the structure. Molecular weight determined by GPC in dimethylformamide/LiBr 0.1% vs. PEG standards: Mw=27,000; Mn=13,000.

The foregoing examples illustrate the relative ease with which the polyethers of the present invention may be prepared. These examples, and the foregoing description of the preferred embodiment, should be taken as illustrating, rather than as limiting, the present invention as defined by the claims. As will be readily appreciated, numerous variations and combinations of the features set forth above can be utilized without departing from the present invention as set forth in the claims. Such variations are not regarded as a departure from the spirit and scope of the invention, and all such modifications are intended to be included within the scope of the following claims.

What is claimed is:

1. A polyether copolymer characterized by strictly alternating poly(alkylene oxide) and aromatic diol monomeric repeating units having the structure:

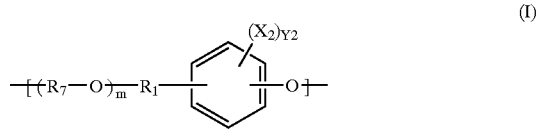

(I)

wherein $R_1$ is sleected from the group consisting of alkyl, aryl, or alkylaryl groups with up to 18 carbon atoms, provided that $R_1$ contains between 9 and 18 carbon atoms when $R_1$ is an alkylaryl group; or $R_1$ has the structure:

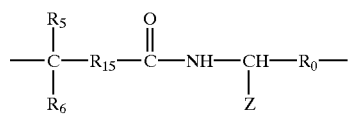

wherein $R_5$ and $R_6$ are each independently selected from the group consisting of H, Br, I and straight and branched alkyl groups having up to 18 carbon atoms, $R_0$ is selected from the group consisting of $(-CH_2-)_d$, $-CH=CH-$ and ($-$CHJ$_1$$-$CHJ$_2$), R$_{15}$ is selected from the group consisting of ($-$CH$_2$$-$)$_c$, $-$CH$=$CH$-$ and ($-$CHJ$_1$$-$CHJ$_2$), wherein J$_1$ and J$_2$ are independently Br or I; c and d are independently between 0 and 8, inclusive; and Z is selected from the group consisting of H, a free carboxylic acid group or an ester or amide thereof; R$_7$ is selected from the group consisting of alkylene groups containing from 1 to 4 carbon atoms; m is between about 5 and about 3,000; X$_2$ is independently I or Br; and Y$_2$ is between 0 and 2, inclusive.

2. The polyether of claim 1, characterized in that R$_1$ contains as part of its structure a carboxylic acid group or an ester or amide thereof, wherein said ester or amide is selected from the group consisting of straight and branched alkyl and alkylaryl groups containing up to 18 carbon atoms in addition to the rest of the R$_1$ structure, where said ester or amide covalently bonds a biologically or pharmaceutically active compound to said polyether.

3. The polyether of claim 2, characterized in that R$_1$ has the structure:

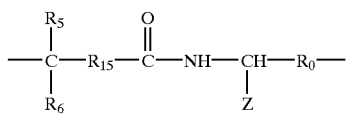

wherein R$_5$ and R$_6$ are each independently selected from the group consisting of H, Br, I and straight and branched alkyl groups having up to 18 carbon atoms, R$_0$ is selected from the group consisting of ($-$CH$_2$$-$)$_d$, $-$CH$=$CH$-$ and ($-$CHJ$_1$$-$CHJ$_2$$-$), R$_{15}$ is selected from the group consisting of ($-$CH$_2$$-$)$_c$, $-$CH$=$CH$-$ and ($-$CHJ$_1$$-$CHJ$_2$), wherein J$_1$ and J$_2$ are independently Br or I; c and d are independently between 0 and 8, inclusive; and Z is selected from the group consisting of H, a free carboxylic acid group or an ester or amide thereof.

4. The polyether of claim 1, characterized in that Z has the structure:

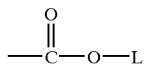

(III)

wherein L is selected from hydrogen, and straight and branched alkyl and alkylaryl groups containing up to 18 carbon atoms, or L is a covalently bonded biologically or pharmaceutically active compound.

5. The polyether of claim 1, characterized in that Z has the structure:

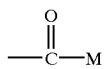

(IIIa)

wherein M is selected from the group consisting of $-$OH, $-$NH$-$NH$_2$, $-$O$-$R$_8$$-$NH$_2$, $-$O$-$R$_8$$-$OH, $-$NH$-$R$_8$$-$NH$_2$, $-$NH$-$R$_8$$-$OH,

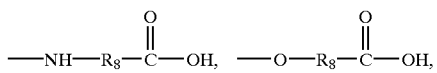

and C-terminus protecting groups or M is a biologically or pharmaceutically active compound covalently bonded to the polyether by means of an amide bond or an ester bond;
wherein R$_8$ is selected from the group consisting of alcylene groups containing from 2 to 6 carbon atoms, α-, β-, γ- and ω-amino acids and peptide sequences.

6. The polyether of claim 5, characterized in that L is a proline or a proline analog covalently bonded to said pendent carboxylic acid group by means of an amide bond.

7. The polyether of claim 5, characterized in that at least 2.5% of said carboxylic acid groups have a biologically or pharmaceutically active compound covalently bonded thereto.

8. The polyether of claim 7, characterized in that every pendent carboxylic acid group has a biologically or pharmaceutically active compound covalently bonded thereto.

9. The polyether of claim 1, characterized in that Z has the structure:

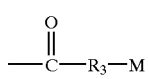

(IIIb)

wherein M is a pharmaceutically or biologically active compound covalently bonded to said carboxylic acid group by means of R$_3$, wherein R$_3$ is a linkage selected from the group consisting of:

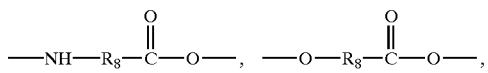

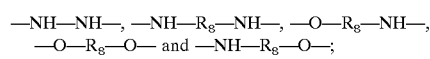

wherein R$_8$ is selected from the group consisting of alkylene groups containing from 2 to 6 carbon atoms, α-, β-, γ- and ω-amino acids, and peptide sequences.

10. The polyether of claim 9, characterized in that M is a proline or proline analog comprising a secondary amine linked to said polyether by means of R$_3$.

11. The polyether of claim 9, characterized in that at least 25% of said carboxylic acid groups have a biologically or pharmaceutically active compound covalently bonded thereto.

12. The polyether of claim 11, characterized in that every carboxylic acid group has a biologically or pharmaceutically active compound covalently bonded thereto.

13. The polyether of claim 3, characterized in that R$_{15}$ is ($-$CH$_2$$-$)$_d$, wherein d is 0 and R$_1$ and R$_2$ are independently selected from the group consisting of hydrogen and a methyl group.

14. The polyether of claim 13, characterized in that R$_1$ and R$_2$ are both hydrogen.

15. The polyether of claim 13, characterized in that one of R$_1$ and R$_2$ is hydrogen and the other is a methyl group.

16. The polyether of claim 3, characterized in that Z is said carboxylic acid ester, said ester being selected from the group consisting of ethyl, butyl, hexyl, octyl and benzyl groups.

17. The polyether of claim 16, characterized in that d is 1 and Z is an ethyl ester.

18. The polyether of claim 2, characterized in that R$_1$ has the structure:

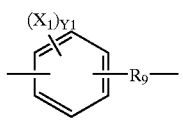

(IV)

wherein $X_1$ is 1 or Br; Y1 is between 0 and 2, inclusive; and $R_9$ is selected from the group consisting of alkyl, aryl and alkylaryl groups containing up to 18 carbon atoms.

19. The polyether of claim 18, characterized in that $R_9$ has the structure:

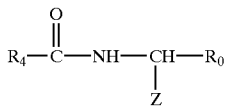

(II)

wherein $R_0$ is selected from the group consisting of —CH═CH—, —$CHJ_1$—$CHJ_2$— and (—$CH_2$—)$_d$, $R_4$ is selected from the group consisting of —CH═CH—, —$CHJ_1$—$CHJ_2$— and (—$CH_2$—)$_a$ in which a and d are between 0 and 8 inclusive, and $J_1$ and $J_2$ are independently Br or I; and Z is selected from the group consisting of H, a free carboxylic acid group, or an ester or amide thereof.

20. The polyether of claim 19, characterized in that Z has the structure:

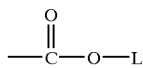

(III)

wherein L is selected from hydrogen, and straight and branched alkyl and alkylaryl groups containing up to 18 carbon atoms, or L is a covalently bonded biologically or pharmaceutically active compound.

21. The polyether of claim 19, characterized in that Z has the structure:

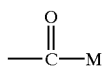

(IIIa)

wherein M is selected from the group consisting of —OH, —NH—$NH_2$, —O—$R_8$—$NH_2$, —O—$R_8$—OH, —NH—$R_8$—$NH_2$, —NH—$R_8$—OH,

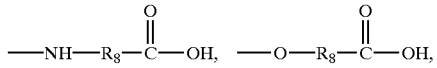

and C-terminus protecting groups or M is a biologically or pharmaceutically active compound covalently bonded to the polyether by means of an amide bond or an ester bond;
  wherein $R_8$ is selected from the group consisting of alkylene groups containing from 2 to 6 carbon atoms, α-, β-, γ- and ω-amino acids, and peptide sequences.

22. The polyether of claim 21, characterized in that L is a proline or proline analog covalently bonded to said carboxylic acid group by means of an amide bond.

23. The polyether of claim 21, characterized in that at least 25% of said carboxylic acid groups have a biologically or pharmaceutically active compound covalently bonded thereto.

24. The polyether of claim 23, characterized in that every carboxylic acid group has a biologically or pharmaceutically active compound covalently bonded thereto.

25. The polyether of claim 19, characterized in that Z has the structure;

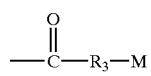

(IIIb)

wherein M is a pharmaceutically or biologically active compound covalently bonded to said carboxylic acid group by means of $R_3$, wherein $R_3$ is a linkage selected from the group consisting of:

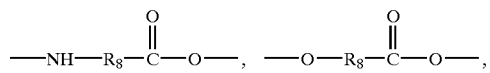

—NH—NH—, —NH—$R_8$—NH—, —O—$R_8$—NH—,
—O—$R_8$—O— and —NH—$R_8$—O—;

wherein $R_8$ is selected from the group consisting of
    alkylene groups containing from 2 to 6 carbon atoms,
    α-, β-, γ- and ω-amino acids, and peptide sequences.

26. The polyether of claim 25, characterized in that M is a proline analog comprising a secondary amine linked to said polyether by means of $R_3$.

27. The polyether of claim 25, characterized in that at least 25% of said carboxylic acid groups have a biologically or pharmaceutically active compound covalently bonded thereto.

28. The polyether of claim 19, characterized in that $R_4$ is —$CH_2$—$CH_2$—.

29. The polyether of claim 19, characterized in that Z is said carboxylic acid ester, said ester being selected from the group consisting of ethyl, butyl, hexyl, octyl and benzyl groups.

30. The polyether of claim 29, characterized in that Z is an ethyl ester.

31. An implantable medical device characterized by polyether of claim 1.

32. The implantable medical device of claim 31, characterized in that the surface of said device is coated with said polyether.

33. A film for use as a barrier to prevent the formation of surgical adhesions, characterized by being cast from the polyether of claim 1.

34. A drug delivery device, characterized by a biologically or pharmaceutically active compound in combination with the polyether of claim 3, wherein said active compound is present in amounts sufficient for therapeutically site-specific or systemic drug delivery.

35. The drug delivery device of claim 34, characterized in that said biologically or pharmaceutically active compound is covalently bonded to said polyether.

36. The drug delivery device of claim 35, characterized in that said biologically or pharmaceutically active compound is a proline analog covalently bonded to said polyether by means of an amide bond.

37. The drug delivery device of claim 34, characterized in that said biologically or pharmaceutically active compound is physically admixed with said polyether or physically embedded or dispersed into a polymeric matrix formed from said polyether.

38. A method for site-specific or systemic drug delivery characterized by implanting in the body of a patient in need thereof an implantable drug delivery device comprising a therapeutically effective amount of a biologically or pharmaceutically active compound in combination with the polyether of claim 1.

39. The method of claim 38, characterized by said biologically or pharmaceutically active compound being covalently bonded to said polyether.

40. The method of claim 39, characterized in that said biologically or pharmaceutically active compound is a proline analog covalently bonded to said polyether by means of an amide bond.

41. A pharmaceutical dosage form characterized by an aqueous medium comprising micelles of the polyether of claim 1 dispersed therein; and a hydrophobic biologically or pharmaceutically active compound incorporated within said micelles.

42. A method for delivering a hydrophobic biologically or pharmaceutically active compound to a patient in need thereof characterized by administering to said patient a therapeutically effective amount of the pharmaceutical dosage form of claim 41.

43. A method for preventing the formation of adhesions between injured tissues characterized by inserting as a barrier between said injured tissues a sheet or film consisting essentially of the polyether of claim 3.

44. A method of regulating cellular attachment, migration and proliferation on a polymeric substrate, comprising contacting living cells, tissues or biological fluids containing living cells with the polyether of claims 3.

45. The method of claim 44, characterized by said polyether being in the form of a coating on a medical implant.

46. The method of claim 44, characterized by said polyether being in the form of a film.

47. The method of claim 44, characterized by said polyether being in the form of a polymeric tissue scaffold.

48. A pharmaceutical composition characterized by (a) the polyether of claim 1, comprising one or more side chains conjugated to a biologically or pharmaceutically active compound; and (b) a pharmaceutically acceptable carrier for said polyether conjugate.

49. The pharmaceutical composition of claim 48, characterized by being in the form of a tablet, capsule, suspension, solution, emulsion, liposome or aerosol.

50. The pharmaceutical composition of claim 49, characterized by being in the form of an injectable suspension, solution or emulsion.

51. The pharmaceutical composition of claim 49, characterized by being in the form of an injectable liposome composition.

52. The polyether of claim 1, having a hydrophobic/hydrophilic ratio characteristic of a polymer surfactant for hydrophobic drug delivery that forms aqueous polymer micelles that are stable under physiological conditions and that has a minimum micellar concentration low enough for said micelles to remain stable upon dilution by injection into a patient's bloodstream.

53. The polyether of claim 52, wherein said poly(alkylene oxide) is poly(ethylene glycol).

54. A pharmaceutical dosage form characterized by an aqueous medium comprising micelles of the polyether of claim 52 dispersed therein; and a hydrophobic biologically or pharmaceutically active compound incorporated within said micelles.

55. A method for delivering a hydrophobic biologically or pharmaceutically active compound to a patient in need thereof comprising administering to said patient a therapeutically effective amount of the pharmaceutical dosage form of claim 54.

* * * * *

UNITED STATES PATENT AND TRADEMARK OFFICE
CERTIFICATE OF CORRECTION

PATENT NO. : 6,602,497 B1
DATED : August 5, 2003
INVENTOR(S) : J. Kohn, D. Bolikal and F. D'Acunzo It is certified that error appears in the above-identified patent and that said Letters Patent is hereby corrected as shown below:

Column 22,
Line 53, "is seleected" should be -- is selected --

Column 24,
Line 5, "2.5%" should be -- 25% --.

Column 25,
Line 8, "is 1" should be -- is I --

Column 26,
Line 41, "by poly-" should be -- by a poly- --
Line 51, "of claim 3" should be -- of claim 1 --

Column 27,
Lines 26 and 29, "of claim 3" should be -- of claim 1 --

Signed and Sealed this

Twenty-seventh Day of July, 2004

JON W. DUDAS
*Acting Director of the United States Patent and Trademark Office*